United States Patent [19]

Shepherd

[11] Patent Number: 5,474,319

[45] Date of Patent: Dec. 12, 1995

[54] STABILISER SYSTEM FOR VEHICLES

[75] Inventor: Donald W. Shepherd, 5 Cherry Lane, Dringhouses, York YO2 2QH, England

[73] Assignee: Donald W. Shepherd, London, England

[21] Appl. No.: 409,888

[22] Filed: Mar. 21, 1995

Related U.S. Application Data

[63] Continuation of Ser. No. 190,171, filed as PCT/GB92/01466, Aug. 7, 1992, abandoned.

[30] Foreign Application Priority Data

| Aug. 7, 1991 | [GB] | United Kingdom | 9118973 |
| Mar. 16, 1992 | [GB] | United Kingdom | 9205696 |

[51] Int. Cl.$^6$ .................................................. B62H 1/12
[52] U.S. Cl. ......................................... 280/302; 280/293
[58] Field of Search .................................. 280/293, 301, 280/302, 303, 304, 299, 300

[56] References Cited

U.S. PATENT DOCUMENTS

| 502,298 | 8/1893 | Hyams | 280/302 |
| 1,154,089 | 9/1915 | Bryant | 280/302 |
| 1,251,684 | 1/1918 | Murray | 280/302 |

FOREIGN PATENT DOCUMENTS

| 29724 | 8/1907 | Austria | 280/302 |
| 2546840 | 12/1984 | France . | |
| 94317 | 9/1897 | Germany . | |
| 697355 | 10/1940 | Germany | 280/293 |
| 282990 | 1/1965 | Netherlands | 280/293 |
| 183362 | 10/1936 | Switzerland . | |
| WO9009918 | 2/1990 | WIPO . | |

*Primary Examiner*—Mitchell J. Hill
*Attorney, Agent, or Firm*—Price, Heneveld, Cooper, DeWitt & Litton

[57] ABSTRACT

A stabilizer system, primarily for supporting a pedal bicycle and its rider upright at the halt, comprises a spring-loaded telescopic arm (26) which is connected at its upper end by a pivot (21) adjacent the rear wheel spindle (12) to a bracket secured to the spindle (12). A bolt (31) pivoted to the bracket engages the gusset plate (13) to resist clockwise motion of the bracket and a gas strut (28) extends between the bracket and the arm (26). At the lower end of the arm (26) is a cross-shaft (33) carrying stabilizer wheels (34,35). The arm can be lowered by a cable (46) to move a roller (36) on the cross shaft beneath the tire of the wheel (11) so that a large part of the weight of the rider is transferred to the ground through the rear wheel (11), the roller (36), the cross shaft (33) and the stabilizer wheels (34,35). The cable (46) is in the form of a closed loop and passes around a guide (41) on the cross shaft, around tapered guide pulleys (77) carried by a dependent bracket (62) within which is pivoted an arm (53) carrying a shaft (56) on which there is a tire-engaging wheel (57) and two spools (58). The bracket (62) contains a cam (67) which can be operated from the handlebars via a Bowden cable (75). To lower the arm (26), the wheel (57) is moved by the cam into engagement with the tire of the bicycle wheel (11) to rotate the spools (58) and draw in the cable (46).

18 Claims, 3 Drawing Sheets

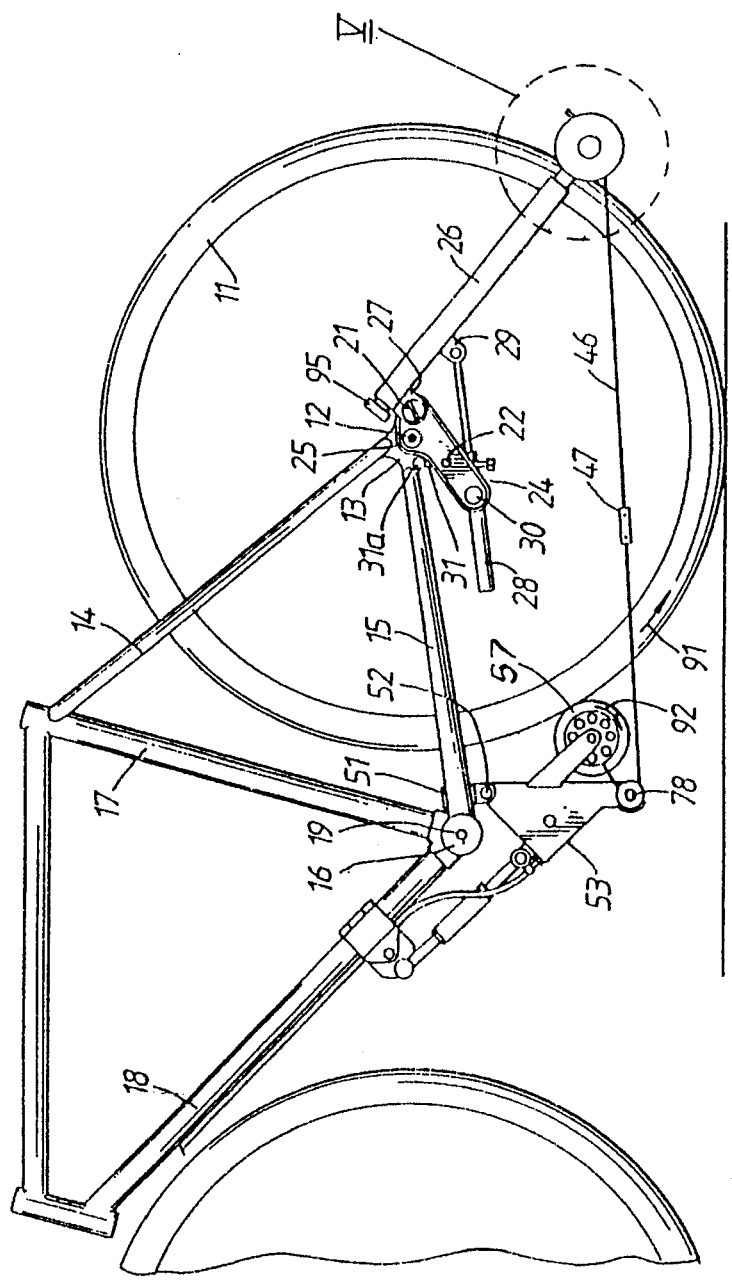
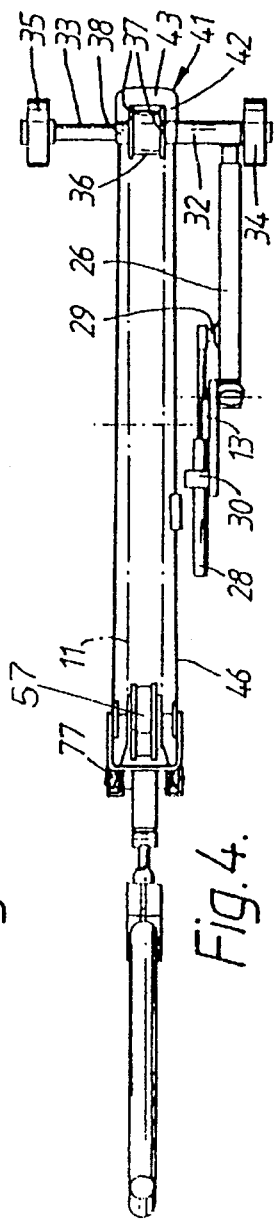
Fig. 1
Fig. 4

5,474,319

STABILISER SYSTEM FOR VEHICLES

This application is a continuation of U.S. patent application Ser. No. 08/190,171, filed Feb. 7, 1994, now abandoned.

BACKGROUND OF THE INVENTION

The present invention relates to a stabilizer system for two wheeled vehicles, particularly vehicles which are powered by a rider. The invention relates most particularly, but not exclusively, to pedal bicycles and pedal-assisted bicycles.

The rider of a bicycle experiences frequent stops and starts in urban areas due to road intersections, slow moving traffic and traffic congestion, road works and other obstructions. These conditions are a common occurrence for cyclists in towns and in urban areas and can result in potentially dangerous situations where the cyclist has to stop precipitately and may lose his or her balance in the process.

In such traffic conditions, the cyclist has to put one or both feet on the ground at each stop and in many instances may have to dismount partially. The frequent and often abrupt stops and starts in traffic are highly inconvenient to the cyclist. They may also be potentially dangerous through loss of balance, impatient behaviour due to frustration and the like, particularly when the traffic includes heavy trucks.

The design of the pedal bicycle and the physical dimensions of the rider often result in saddle seats which are set either too low for maintaining efficient pedal pressure or too high for remaining in the saddle when at the halt. This can lead to frequent dismounting and remounting.

There is described in WO90/09918 A1 a stabilizer system, particularly for bicycles, which incorporates an arm pivoted at its upper end at or adjacent the rear wheel spindle of the vehicle and having at its lower end a cross shaft carrying stabilizers and a wheel-engaging roller, and means for lowering the arm to draw the cross shaft beneath the wheel, so that the tire on the wheel engages the roller and the wheel is lifted off the ground. With this arrangement a large part of the weight of the rider is transferred to the ground through the wheel, the roller, the cross shaft and the stabilizers.

The means for lowering the arm described in WO90/09918 A1 comprises a spool on the pedal spindle, the arm being lowered by back-pedalling to draw a cable from the lower end of the arm onto the spool. While this arrangement is satisfactory, some cyclists do not find back-pedalling as they come to the halt easy to control or achieve. Moreover, power to lower the arm has to be provided by the rider. Also, the arrangement, while capable of being designed to be added to an existing bicycle, is particularly suited to being fitted as original equipment. Accordingly it is an object of the present invention to provide, in a stabilizer system of the general construction described, an alternative means of lowering the arm which can deal with one or more of these points.

SUMMARY OF THE INVENTION

According to the present invention the means for lowering the arm comprises a rotary member such as a roller, rider-actuatable means for moving the rotatable member into engagement with a tire on the said rear wheel of the vehicle to cause the rotary member to rotate, a spool rotatable by the rotary member, and a flexible element such as a cable windable on the spool and connected to the arm so that rotation of the spool draws the flexible element onto the spool and draws the roller beneath the wheel.

Preferably the rotary member and the spool are carried on a common shaft to rotate together and are preferably located ahead of the rear wheel. In a preferred construction, the shaft carries a second spool to rotate with the first spool, a length of cable running from each spool to the arm. The shaft may be carried by a swing arm pivoted at or adjacent one end to the frame of the vehicle about a horizontal axis, preferably to swing in a vertical plane coinciding with the plane of the rear wheel of the vehicle. The rider-actuatable means may comprise a cam acting on the swing arm and coupling means, such a Bowden cable, connected to manually operable means for operation by the rider, for example, a lever on the handlebars of the bicycle and arranged to rotate the cam to swing the arm. In one possible arrangement, the cam is mounted on a dependent element rigidly but possibly adjustably secured to the frame of the vehicle, the swing arm being pivoted adjacent the upper end of the dependent element. The swing arm and the dependent element may be mounted from the frame of the vehicle on a common pivot pin, the dependent element being also connected to the frame of the vehicle by a link, preferably of adjustable length, to locate the dependent element rigidly relative to the frame.

Although it is possible to incorporate a stabilizer system constructed according to the invention as original equipment, the invention is particularly suitable for stabilizers which may be retro-fitted to existing bicycles.

BRIEF DESCRIPTION OF THE DRAWINGS

The invention may be carried into practice in various ways but one stabilizer system constructed in accordance with the invention will now be described by way of example with reference to the accompanying diagrammatic drawings, in which:

FIG. 1 is a diagrammatic and fragmentary side elevation of the rear part of a bicycle with the stabilizer system fitted thereto and to a slightly smaller scale than FIGS. 2, 3 and 5;

FIG. 4 is a top plan view of the stabilizer system, shown separate and unmounted from the bicycle.

DESCRIPTION OF THE PREFERRED EMBODIMENTS

Figure 2:
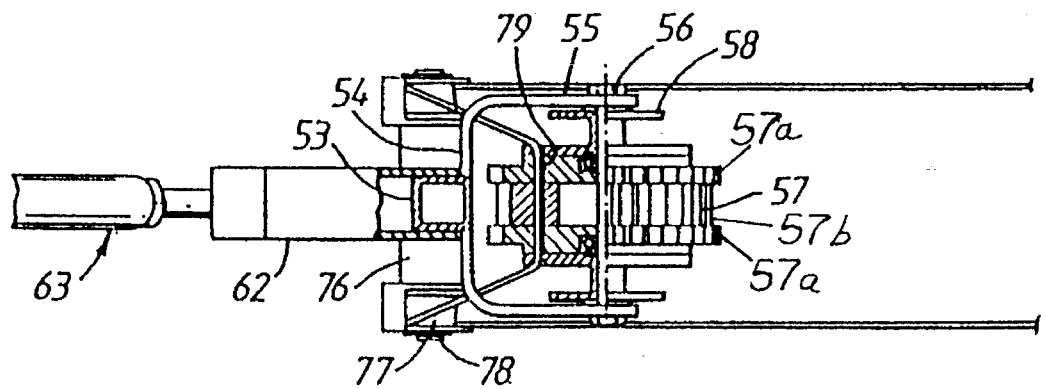
FIG. 2 is a fragmentary horizontal section which is taken approximately on the line II—II in FIG. 3 but the section line has been adjusted in parts to show the construction more clearly.

FIG. 1 shows, in simplified form, the rear wheel 11 of a bicycle having a rear wheel hub 12 carried on each side in a gusset plate 13 which is welded to the ends of a seat stay 14 and a chain stay 15. The bicycle includes a bottom bracket 16 to which is connected the seat tube 17 and the down tube 18 and which provides bearings for the pedal spindle 19. The pedal spindle carries a chain wheel, not shown, and a chain passes around the chain wheel and the drive sprocket on the rear wheel hub 12. The bicycle includes a derailleur change speed gear which is not shown in the drawing but, alternatively, the bicycle could include a hub-type change speed gear or no gear change means.

Attached to the frame of the bicycle in the vicinity of the rear wheel hub 12 and on the side of the frame opposite to that of the drive sprocket is an elongate bracket 24 made as a flanged steel pressing. The bracket has an apertured ear 25 on its upper edge intermediate its length which is clamped by one of the rear wheel spindle nuts between this nut and the gusset plate 13. A stabilizer strut or arm 26 has at its upper end a lug 27 by which is is pivoted to a stub axle 21 at the rear end of the bracket 24 about a horizontal axis which is parallel to but is spaced rearwardly from the axis of the rear wheel spindle 12. The strut 26 is biased to the raised or inoperative position as shown in FIG. 1 by a gas or other spring 28 which is pivoted at one end to a lug 29 intermediate the ends of the strut 26 and at another point intermediate its length to a stub axle 30 at the forward end of the bracket 25.

On the inner side of the bracket 24, and therefore not visible in FIG. 1 and omitted from FIG. 4, a mounting block is carried by a pin 22 rotatable in the bracket, the block having a threaded aperture through which is threaded a bolt 31 having at its upper end an abutment block 31*a* which is pivoted to the bolt for rotation about the longitudinal axis of the bolt. The block 31*a* is formed with a notch to receive the lower edge of the gusset plate 13. The mounting block, the bolt 31 and the abutment block 31*a* constitute an adjustable stop which transfers loads acting clockwise (as seen in FIG. 1) from the strut 26 to the frame of the bicycle and permits adjustment of the location of the strut as will be described below.

The lower end of the strut 26 carries a sleeve 32 (FIG. 4) in which a hollow cross shaft 33 is rigidly secured. Opposite ends of the shaft 33 carry freely rotatable ground engaging stabilizer wheels 34, 35. In the central region of the shaft 33 there is a freely rotatable roller 36 which is generally aligned with the plane of the wheel 11 and has flanges 37 which are spaced apart so as snugly to engage the opposite sides of the tire when the stabilizer is in operation as will be described below.

Figure 5:
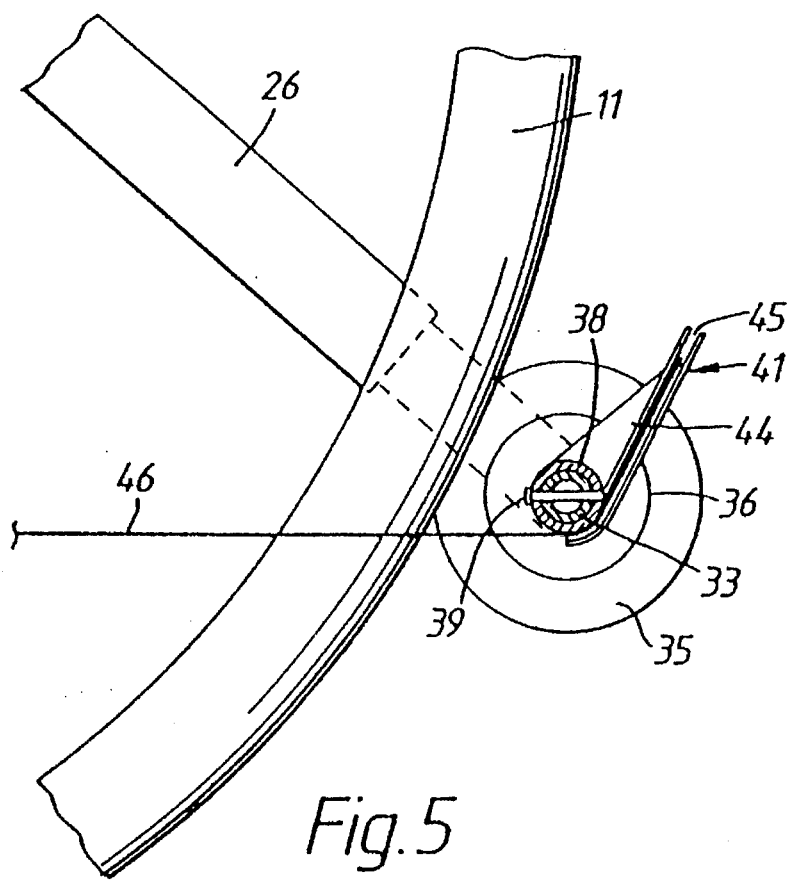
FIG. 5 is an enlarged view of detail IV in FIG. 1.

On either side of the roller 36 there is a pair of sleeves 38 which are rigidly secured by pins 39 to the shaft 33 and a shaped cable guide plate 41 is secured to these sleeves. The plate 41 is generally C-shaped having a pair of spaced limbs 42 which are curved at their extremities as can be seen in FIG. 5 so as to correspond to the curvature of the outer surface of the sleeves 38 and a generally rectangular connecting portion 43. A pair of gussets 44 are secured to the sleeves 38 and to the plate 41 to provide stiffening. The outer edge of the plate 41 is formed with a relatively deep groove 45 to provide a guide for a cable 46, the cable being a loose fit in the groove so that it may slide along the groove in either direction, the curvature of the outer ends of the limbs 42 of the plate 41 providing a convenient transition zone at each end of the groove 45 as can be seen in FIG. 5. The cable 46 is formed into an endless loop by means of a single connector 48 which joins the two ends of the loop and provides a means for adjusting the length of the loop.

The angling of the plate 41 (as viewed in FIGS. 1 and 5) serves two purposes. Firstly, it keeps it clear of the ground as the strut 26 is moved to the operative position as will be described, even with a partially or fully deflated tire. Secondly, the path of the cable 46 changes direction as it enters and leaves the groove 45 and is partially wrapped around the sleeves 38. The sleeves 38 are non-rotatable so that friction is developed between the sleeves 38 and the cable 46, thus reducing the load imparted by the cable to the plate 41. While this friction is advantageous in reducing the load applied to the plate 41, it should not be so great as to prevent the cable slipping lengthwise of itself in order substantially to equalise the tension in the parts of the cable on opposite sides of the bicycle. The amount by which the plate 41 is angled will be selected to produce an appropriate amount of friction around the sleeves 38 while producing the required ground clearance for the plate 41.

Clamped to the forward ends of the chain stays 15 adjacent the bottom bracket 16 is an adjustable anchorage 51 carrying a central horizontal pivot 52 for the upper end of a swing arm 53 (FIGS. 2 and 3) which is able to pivot in the plane of the rear wheel 11.

The swing arm, which is formed of a square tube, carries at its lower end a U-shaped bracket 54 having a pair of rearwardly and downwardly directed arms 55 having apertures containing bearings in which a spindle 56 is journalled. A tire engaging rotary member or wheel 57 and a pair of spools or winches 58 are rigidly secured to the spindle 56 between the two arms 55. The wheel 57 has outer flanges 57*a* and a central groove 57*b* (FIG. 2) all of which are formed with teeth to achieve a good entrainment between the tire and the wheel, this being assisted by the fact that the teeth on the flanges are displaced by half a tooth pitch around the circumference relative to the teeth in the groove.

In the construction being described, the diameter of the tire-engaging wheel 57 is approximately six times that of the base of the groove in each of the spools 58. It is desirable to make the wheel 57 and the spools 58 as large as convenient but the size is of course limited by the geometry of the surrounding parts of the bicycle. Large diameters reduce the speed of rotation, increase the torque available, reduce the risk of the wheel 57 slipping on the tire and ensure that the cable 46 lays neatly on the spools as will be described.

The stabilizer system includes an actuator means which includes a stator unit 61 which comprises a box member or dependent element 62 which is of generally triangular elevation and is pivoted at its upper corner on the pivot 52 on the bracket 51 and is held in position by an adjustable length strut or adjustable link 63 pivoted at one end to a lug 64 on the box member 62 and at the other end to an adjustable clamp 65 on the down tube 18. A transverse pin 66 extending between the side walls of the box member 62 carries a cam 67 which has a lobe 68 engaging the swing arm 53 and an arm 69 receiving one end of the core of a Bowden cable 75. This cable extends to a manually operable control lever (not shown) on the handlebars of the bicycle. The sheath of the Bowden cable is adjustably secured to the front wall of the box member 62. For purposes to be described below, the actuator lever on the handlebars has a latching operative position and a secondary lever by which the actuator lever can be released from its operative position.

Extending from each side of the box member 62 adjacent its bottom are housings 76 containing tapered flanged guide pulleys 77 which are rotatable on a cross-shaft 78.

The run of the cable 46 is best seen in FIGS. 2, 4 and 5 and is as follows. From one end of the groove 45 in the cable guide plate 41, the cable extends forward to one of the guide pulleys 77 and then rearwardly to one of the spools 58. It then passes through a bore 79 extending through the inner flange of the said spool, the tire-engaging wheel 57 and the inner flange of the other spool 58. From this spool, the cable passes around the other guide pulley 77 and extends rearwardly to the other end of the groove 45 and along the groove to complete the loop. The housings 76 have windows to permit passage of the cable 46 to and from the pulleys 77.

Figure 3:
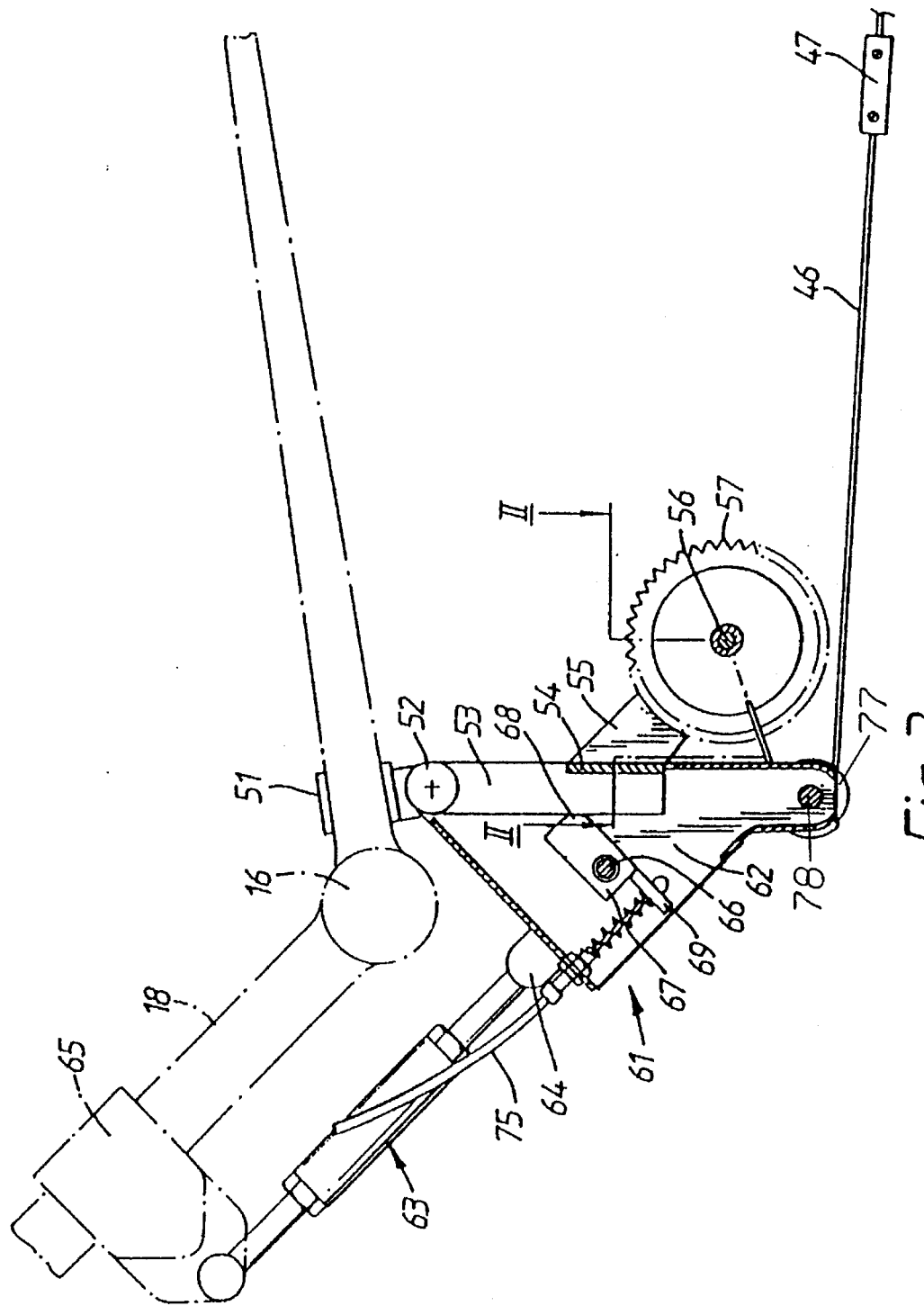
FIG. 3 is an enlarged side elevation partly broken away of the parts of the stabilizer system shown in FIG. 2.

Operation of the stabilizer is as follows. During normal riding, the stabilizer system is in the condition shown in FIG. 1 with the strut 26 in the raised position. It is maintained in this position by the gas spring 28 tending to pivot the strut 26 in the anti-clockwise direction as seen in FIG. 1, such movement being prevented by tension in the cable 46. When the rider comes near to stopping and wishes to be supported by the stabilizer system when he comes to a halt, he operates the control lever on the handlebars by moving it from the inoperative position to the operative position. This causes the cam 67 to rotate in a clockwise direction as seen in FIGS. 1 and 3 so that the cam lobe 68 causes the swing arm 53 to swing counter-clockwise as seen in FIGS. 1 and 3 to bring the roller 57 into engagement with the tire of the wheel 11 which is rotating in the direction of the arrow 91. This causes the roller 57 to rotate in the direction of the arrow 92, the spools 58 rotating in the same direction and winding in the cable 46. This causes the strut 26 to move from the inoperative position seen in FIG. 1 to an operative position beneath the wheel 11 causing the stabilizer wheels 34, 35 to engage the ground and the roller 36 to engage the tire of the wheel 11, both because of the eccentric mounting of the upper end of the strut 26 relative to the axis of rotation of the wheel 11 and because of a degree of compressibility in the strut 26 which is of spring-loaded telescopic construction. As the ground engaging wheels 34, 35 and the tire-engaging roller 36 move under the wheel 11 the bicycle wheel 11 is lifted off the ground, the arm 26 continuing to move clockwise until it is unable to move any further. The rider will time this to occur substantially at the time the bicycle comes to a halt. The weights of the rider and of the bicycle are largely transferred to the ground through the tire, the roller 36 and the wheels 34 and 35 but a small proportion of this weight will be transmitted through the strut 26. It will be seen that the stabilizer device will, provided that the bicycle is maintained approximately upright, support the bicycle in the upright position without the rider having to place a foot on the ground. It is also possible for the rider to dismount and to leave the bicycle in a parked condition.

The telescopic strut 26 has adjustment means, in this particular case a screw-threaded rod having a turn-key 95 at its upper end by which the pre-compression of a variable rate spring provided between the two telescoping parts of the strut can be adjusted, in order to accommodate riders of different weights.

When the rider wishes to move off, the control lever on the handlebars is released thus causing the cam 67 to retract to allow the swing arm 53 to move clockwise as seen in FIG. 3 to release the wheel 57 from the tire of the wheel 11 and removing the restraint on rotation of the spools 58. A spring may be provided to bias the swing arm clockwise to encourage movement of the wheel 57 away from the tire. The strut 26 then moves back towards the retracted position under the influence of the gas spring 28 and the tendency of the bicycle to move forwards as the rear wheel drops off the roller 36 once the bicycle brakes have been released. Simultaneously the rider rotates the pedals and rides away smoothly.

Since the cable is able to move longitudinally in the groove 45 in the plate 41, the stabilizer system will be stressed approximately evenly by the two limbs of the cable 46 so that it is not necessary to ensure that initially the two limbs are of equal length and any differential takeup between the two spools 58 or any differential stretch in the two limbs of the cable will be self compensated.

During initial setting up of the stabilizer system, the adjustable stop afforded by the bolt 31 is adjusted to position the bracket 4 and hence the lug 27 appropriately so that, because of the eccentricity between the pivotal axis of the strut 26 and the axis of the rear wheel hub 12, the roller 36 is sufficiently spaced from the tire when the strut 26 is in its retracted position but is sufficiently close to the axis of the rear wheel hub 12 when the strut is in the operative position for the bicycle wheel to be lifted off the ground by the roller 36, taking account of the compressibility of a properly inflated tire.

If the tire should be partially deflated, the strut 26 will be able to move forwardly beyond the operative position and, in the case of a fully deflated tire, reach a position in which the strut is forward of the vertical and the weight of the rider is transferred to the roller 36 essentially through the rim of the wheel and the flattened walls of the tire. Thus, the stabilizer system will still be operative and the strut 26 will not be excessively stressed. However, it may not be possible for the rider to move off from the halt at all easily as this will require the rear wheel to ride over the roller 36. This will provide the rider with a clear indication that the tire is under-inflated.

Although the construction is such that all the major forces on the bracket 24 combine always to produce a clockwise torque on the bracket (as seen in FIG. 1) it is possible that on some occasions, such as riding over a large stone or pot hole or down a kerb, a net counter-clockwise force may exist for a moment leading to bounce of the strut 26 and a disengagement of the abutment block 31a from the gusset plate 13. This could be prevented by the provision of a second adjustable stop (similar to that constituted by the mounting block, bolt 31 and abutment block) mounted on the short arm of the bracket 24 and engaging the gusset plate 13 to the rear of the rear wheel spindle 12. Such a second adjustable stop can be of lighter construction than the first as it does not take any operational loads.

It will be appreciated that various modifications and additions to the construction described can be made and a number will now be described.

In the system shown in the drawings, see FIG. 2, the cable 46 passes through a bore 79 extending through the inner flanges of the two spools and the tire engaging wheel 57. With this construction it is essential that the entries to the bore in the two inner spool flanges are suitably flared to avoid damage to the cable. In an alternative construction, grooves are provided in the peripheries of the two inner flanges of the spools 58 and in the periphery of the wheel 57 and means such as returns at the bottoms of the grooves or cover plates retained by screws are provided for holding the cable within the grooves. Such a construction has the advantage over the bore 79 that it is not necessary to have access to an end of the cable 46 to pass it through the bore 79, the cable 46 can merely be laid in the groove at any point along its length so that it is possible to provide the cable 46 initially in a closed loop. This facility installation by mechanically unskilled bicycle owners.

Although it is stated that the preferred ratio of the diameters of the wheel 57 and the spools 58 is 6:1, other ratios between 2:1 and 10:1, for example, may be employed; larger diameters of spools are preferred to increase the radius of wrap of the cable on the spool but it will be appreciated that the larger the diameter of the spool the smaller the increase in power that can be applied to the cable.

Although the bracket has been described as being a pressing it could alternatively be a metal forging or of some other construction.

Although the strut 26 is described as having means 95 for adjusting the precompression of the spring between the telescoping parts of the strut this may not be necessary. However it may be desirable to provide means for adjusting the initial length of the strut so that a single construction of strut can be adapted to bicycles of different sizes.

In order to prevent the strut 26 swinging too far to the left as seen in FIG. 1 when the stabilizer device is operated, limiting means may be provided, preferably on the gas strut 28. Thus the cylinder of the gas strut ]nay have an internal stop which is engaged by the piston or the piston rod may have a stop which engages the end of the cylinder of the gas strut. In either case a compression spring may be provided to prevent excessive shock as the end position is approached.

Certain features of the construction described may call for some emphasis. Thus it should be noted that the gas strut 28 is pivoted to the bracket 24 at a point intermediate the length of the cylinder of the gas strut and nearer to the piston rod entry end than the closed end, by contrast with the usual mounting of a gas strut which is at each end. It will also be noted that the abutment block 31a on the bolt 31 engages the gusset plate 13 which is an element of considerable strength rather than a point along the length of the chain stay 15 which is a relatively thin tube and ill-adapted to resist laterally applied forces.

Finally it should be noted that the provision of the single horizontal pivot 52 for the swing arm 53 and the stator unit 61 facilitates rapid adaptation of the stabilizer system to bicycles of different sizes and geometry.

What is claimed is:

1. A stabilizer system for two-wheeled vehicles having a front wheel and a rear wheel, comprising
    an arm pivoted at its upper end, near a rear wheel spindle of the vehicle and having at its lower end a cross shaft carrying stabilizers and a wheel-engaging roller, and means for lowering the arm to draw the cross shaft beneath the rear wheel so that a tire on the rear wheel engages the roller and the rear wheel is lifted off the ground, the lowering means comprising:
    a rotary member connected with a frame of the vehicle;
    means for moving the rotary member into engagement with the tire on the rear wheel of the vehicle to cause the rotary member to rotate;
    a spool rotatable by said rotary member; and
    a flexible element windable on the spool and connected to the arm so that rotation of the spool draws the flexible element onto the spool and draws the arm generally downward and into a vehicle stabilizing, operative position from a generally raised and inoperative position.

2. A stabilizer system as claimed in claim 1 in which the rotary member and the spool are carried on a common shaft to rotate together.

3. A stabilizer system as claimed in claim 2 in which the flexible element is a first flexible element, the spool is a first spool, and the shaft carries a second spool to rotate with the first spool, and a second flexible element windable on the second spool and connected to the arm.

4. A stabilizer system as claimed in claim 3 in which the first and second flexible elements are incorporated in a single cable extending from the first spool, around a guide carried by the cross-shaft of the arm, to the second spool.

5. A stabilizer system as claimed in claim 4 in which the cable forms a closed loop and passes directly from the first spool to the second spool as well as via the guide.

6. A stabilizer system as claimed in claim 3 in which each of the first flexible element and the second flexible element extends generally forward, from its respective first spool and second spool, and around a front guide and then rearwardly to the arm.

7. A stabilizer system as claimed in claim 6 in which the front guide includes two front guides that are spaced apart laterally from one another by a greater lateral distance than a lateral spacing of the first and second spools.

8. A stabilizer system as claimed in claim 7 in which the front guides are rotatable pulleys which are tapered so as to be of increasing diameter toward a center line of the vehicle.

9. A stabilizer system as claimed in claim 2 in which the rotary member and the spool are located ahead of the rear wheel.

10. A stabilizer system as claimed in claim 2 in which the shaft is carried by a swing arm, the swing arm having an end pivotally attached to the frame of the vehicle for movement about a horizontal axis.

11. A stabilizer system as claimed in claim 10, in which the swing arm swings in a vertical plane coinciding with a reference plane defined by the rear wheel of the vehicle.

12. A stabilizer system as claimed in claim 10 further including rider-actuatable means that comprises: a cam acting on the swing arm, and a coupling configured for actuating said cam.

13. A stabilizer system as claimed in claim 12 in which the cam is mounted on a dependent element that is operably connected to the frame of the vehicle, the swing arm being pivoted adjacent an upper end of the dependent element.

14. A stabilizer system as claimed in claim 13 including a central pivot that operably connects the swing arm and the dependent element to the frame of the vehicle.

15. A stabilizer system as claimed in claim 14 including an adjustable link operably connected between the dependent element and the frame.

16. A stabilizer system as claimed in claim 1 including a bracket having a length, an aperture intermediate its length, a portion extending rearward of the aperture, and a generally opposing forward extending portion, the aperture receiving the rear wheel spindle in slip-fit engagement, the arm being pivotally connected with the portion extending rearward, and in which a spring extends between the forwardly extending portion of the bracket and the arm at a location spaced from the upper end of the arm, and the bracket carries, forward of the aperture, a stop engaging the frame of the vehicle and preventing rotation of the bracket about the rear wheel spindle.

17. A stabilizer system as claimed in claim 16 in which the stop is configured to adjustably engage the frame so the bracket can be adjusted to a predetermined rotational position relative to the rear wheel spindle.

18. A stabilizer system as claimed in claim 16 in which the portion of bracket extending rearward is a short limb relative to the forward extending portion of the bracket.

* * * * *